(12) United States Patent
Zahir (10) Patent No.: US 6,708,256 B2
(45) Date of Patent: Mar. 16, 2004

(54) MEMORY-TO-MEMORY COPY AND COMPARE/EXCHANGE INSTRUCTIONS TO SUPPORT NON-BLOCKING SYNCHRONIZATION SCHEMES

(75) Inventor: Achmed Rumi Zahir, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 10/230,288

(22) Filed: Aug. 29, 2002

(65) Prior Publication Data

US 2003/0009636 A1 Jan. 9, 2003

Related U.S. Application Data

(62) Division of application No. 09/736,433, filed on Dec. 15, 2000, now Pat. No. 6,502,170.

(51) Int. Cl.[7] .............................................. G06F 12/00
(52) U.S. Cl. ...................................... 711/141; 707/201
(58) Field of Search ........................... 711/141; 707/201

(56) References Cited

U.S. PATENT DOCUMENTS

| | | | | | |
|---|---|---|---|---|---|
| 6,122,712 A | * | 9/2000 | Torii | ........................... | 711/141 |
| 6,442,585 B1 | * | 8/2002 | Dean et al. | .................. | 709/108 |
| 2002/0010794 A1 | * | 1/2002 | Stanbach, Jr. et al. | ...... | 709/245 |

OTHER PUBLICATIONS

Pentium® Pro Family Developer's Manual, vol. 2, Programmer's Reference Manual, 1996 Chapter 11, pp. 11–69 to 11–70.

Pentium® Pro Family Developer's Manual, vol. 2, Programmer's Reference Manual, 1996 Chapter 11, pp. 11–71 to 11–72.

Pentium® Pro Family Developer's Manual, vol. 2, Programmer's Reference Manual, 1996 Chapter 11, pp. 11–271 to 11–272.

Pentium® Pro Family Developer's Manual, vol. 2, Programmer's Reference Manual, 1996 Chapter 11, pp. 11–372 to 11–373.

* cited by examiner

*Primary Examiner*—Jack A. Lane
(74) *Attorney, Agent, or Firm*—Kenyon & Kenyon (57) ABSTRACT

A coherency technique for multiprocessor systems in which threads perform atomic read or atomic write transactions pursuant to memory-to-memory copy instructions or memory-to-memory compare-and-exchange instructions. Although the source reads and target writes are each atomic, the instruction is not required to be atomic from the read through the write operation. Accordingly, once a first thread reads source data pursuant to a read, for example, it may allow other threads to access that data prior to completing its own target write. The data may include a version stamp. After the first thread operates on the data, software may read in the version stamp a second time. If the two version stamps agree, the results of the thread's operation may be considered valid for lookup operations. For a compare and exchange operation, a thread may read data from a source location. Subsequently, the thread may read atomically a current copy of a version stamp from a target address, compare it to a version of the same version stamp obtained earlier, and, if the two version stamps agree, write the source data to the target address.

23 Claims, 5 Drawing Sheets

FIG. 3
COPY 1000

FIG. 4
COMPARE & EXCHANGE 1100

MEMORY-TO-MEMORY COPY AND COMPARE/EXCHANGE INSTRUCTIONS TO SUPPORT NON-BLOCKING SYNCHRONIZATION SCHEMES

IN RELATED APPLICATIONS

This patent application is a divisional application of U.S. application Ser. No. 09/736,433, filed Dec. 15, 2000, U.S. Pat. No. 6,502,170 is incorporated herein by reference and may benefit from the priority thereof.

BACKGROUND

The present invention relates to instruction support for memory-to-memory atomic copy and memory-to-memory compare/exchange instructions in a multiprocessor computer system. More particularly, for threads employing non-blocking synchronization schemes, the instruction support reduces the time in which processors (and hence applications) are subject to memory access lockouts (spin-locks).

The Pentium Pro® processor, commercially available from Intel Corporation of Santa Clara, Calif., provides support for several register-to-memory instructions: loads, stores and compare-and-exchange. The load and store instructions transfer data from registers within the processor to a public memory location or vice versa. The compare and exchange operation compares a value stored in a target address with a value stored in a predetermined pair of registers and, if they are equal, writes the value from a second register pair to the target address. In the Pentium Pro® processor, registers are 32 bits wide; the largest increment of data to be transferred atomically according to these instructions is 64-bits (using the double-word compare-exchange instruction).

The copy (load/store) and compare-and-exchange instructions provide tools for software designers to manage data structures. Of course, software designers routinely manage data structures that are much greater than the size of a single 32-bit register or even a collection of registers. To extend the set of atomic instructions to data sizes that are much larger than a register width, that approach the size of a processor's cache line, the instructions become memory-to-memory data transfers rather than register-to-memory transfers. An instruction requires access to a source address in memory and to a target address in memory. By gaining access to two addresses during the course of program execution, particularly in multi-threaded environments, extension of the copy and compare-and-exchange instruction raises a risk that blocking may occur among parallel threads.

A multi-processor computer system (even a uniprocessor computer system) may include a plurality of "threads," each of which executes program instructions independently from other threads in the system. Multiple agents in a system each are independent threads in the system. Additionally, as is known, resources of a single processor may be shared among several execution processes that are independent from each other. Although the processes execute on a single processor, they may be considered separate threads because their execution is independent from each other much in the same way that execution among two or more processors may be independent from each other. Herein, we use the term "thread" to refer to any logically independent processing agent, regardless of whether the threads are distributed over a single processor (time-multiplexed threading) or multiple processors (space-multiplexed threading) in a computing system.

Blocking may occur when two or more threads attempt to gain ownership of a single data element. Typically, threads engage in administrative protocols to synchronize with each other and to ensure that they use the most current copy of data available to the system. One coherency technique involves locks that are applied to data by a thread while the thread uses the data. If a thread were required to update a data structure, for example, the thread typically must acquire a lock, perform the data update and then release the acquired lock. Other threads that required access to the same data structure would be denied access so long as the lock were applied. The lock renders the first thread's data update operations "atomic" because no other thread can gain access to the locked data until the data structure is completely updated. These locks can lead to significant performance bottlenecks because (1) threads waiting for access to the locked data structure waste CPU cycles until the lock becomes available, and, more importantly (2) threads holding a lock can be interrupted by other processes by a long-latency operation (e.g. due to a page fault or a interval-timer interrupt—often in the millisecond range). In this circumstance, a first thread that acquired a lock would not make forward progress because it was interrupted and another thread requiring access to the locked data structure also could not make forward progress because it was denied access (because the interrupted thread holds the sought after lock). Both threads, the one holding the lock and the one seeking the lock, fail to make progress even though the data structure is not actively being used.

Non-blocking synchronization ("NBS") programming techniques also provide data coherency guarantees but they permit multiple threads to read and update data simultaneously. NBS techniques assign version stamps to data elements. When a thread operates on data, the thread may read a new version stamp from memory and compare it to an older copy of the version stamp that the thread read prior to its data operation. If the two version stamps are identical, the thread can confirm that the results of its data operation are valid. If not, the data element is assumed to have been updated while the data operations were in progress; the thread typically re-reads the data, the version stamps and retries the data operation.

No known processor provides atomic copy or compare-and-exchange instruction support for larger-than-register-size memory-to-memory transfers. No known processor provides such instruction support in the context of an NBS scheme. Accordingly, there is a need in the art for instruction support for memory-to-memory copy and compare-and-exchange instructions that operate on data sizes that approach a cache line size in a processor.

DETAILED DESCRIPTION

Embodiments of the present invention provide a coherency technique for multiprocessor systems in which threads perform atomic read or atomic write transactions pursuant to memory-to-memory copy instructions or memory-to-memory compare-and-exchange instructions. In a copy instruction, reads and writes are each atomic but the instruction is not required to be atomic from the read through the write operation. Accordingly, once a first thread copies data pursuant, it may permit other threads to access or update the data. The data may include a version stamp. After the first thread operates on the copy of the data, it must re-read in the version stamp a second time to validate that the result computed based on the copy of the data is still meaningful. If the two version stamps agree, the results of the thread's operation may be considered valid.

For a compare and exchange operation, a thread may read data and operate upon it. Subsequently, the thread may atomically (1) read a current copy of a version stamp from a target address, (2) compare it to an older version of the same version stamp, and, (3) if the two version stamps agree, write new data to the target address.

Figure 1:
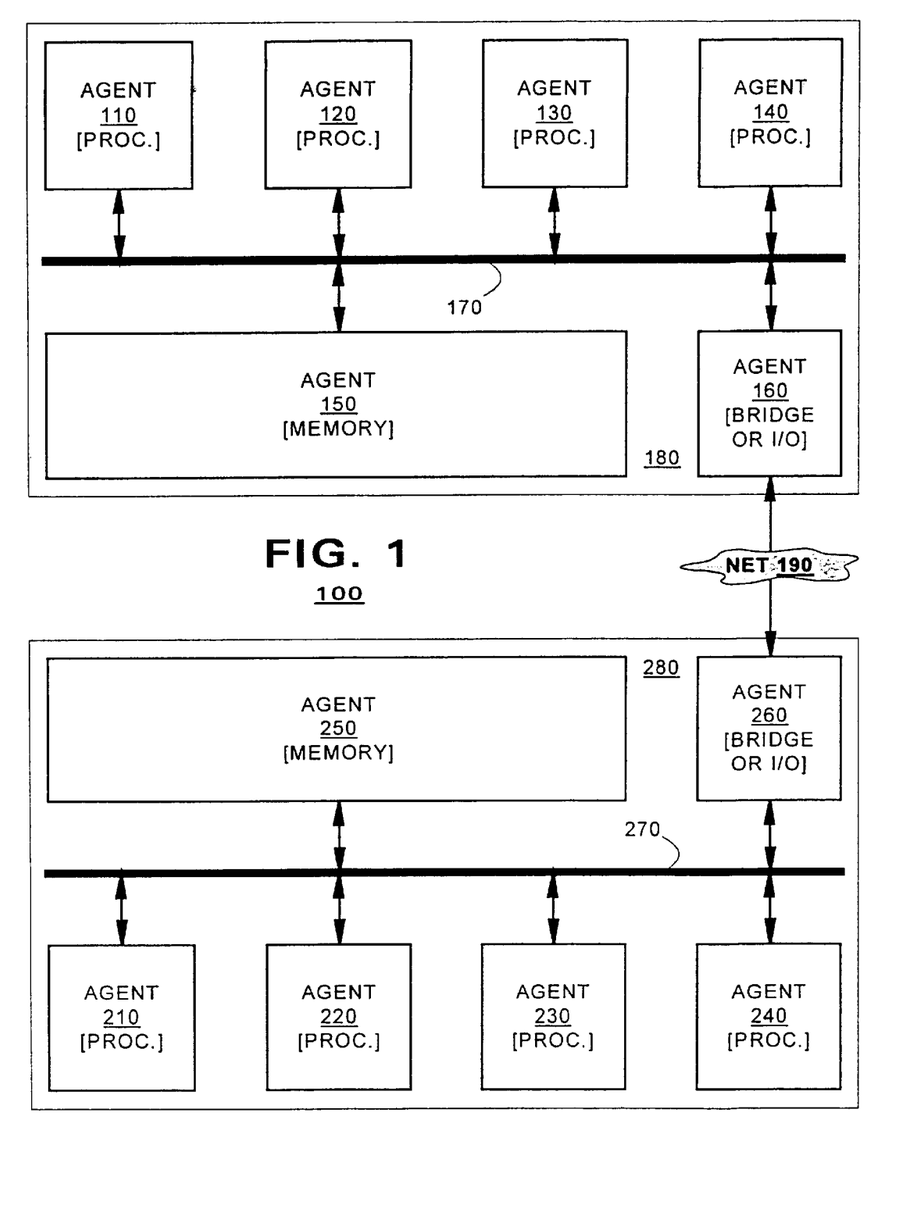
FIG. 1 is a block diagram of a multiprocessor computer system suitable for use with embodiments of the present invention.

FIG. 1 is a block diagram of a multiprocessor computer system 100 suitable for use with embodiments of the present invention. The system may include a plurality of agents 110–160 interconnected via a common communication bus 170. An "agent" includes any processing entity that communicates via the bus 170; agents may include processors 110–140, memories and memory controllers (collectively shown as "memory") 150, bridge interfaces 160, digital signal processors or application-specific integrated circuits (not shown). As described above, the agents may be divided logically into a plurality of threads. A modern computer system 100 may include several clusters 180, 280 of processors interconnected via a network fabric 190. FIG. 1 illustrates two exemplary clusters 180, 280; there may be more. The second cluster 280 is shown as including a plurality of processors 210–240, a system memory 250 and a bridge interface 260 interconnected via a common communication bus 270. This architecture also is merely illustrative; clusters 180, 280 need not be provisioned identically to one another in a distributed processing system.

In such a system, the system memories 150, 250 of the system 100 define a universal, shared cache-coherent memory space. It is possible that, during operation, an agent 110 from one cluster 180 will operate upon data stored in the memory 250 of another cluster 280. Of course, read and write operations from one agent (say, 110) to memory 250 in another cluster 280 may traverse the network fabric 190 which may impose a much longer (and possibly unpredictable) latency to the operation than would a similar operation directed to local memory 150. For the purposes of this discussion, the operation of the various clusters and threads is not material to the operation of the present embodiments. It is sufficient to note that the system 100 defines a shared, coherent memory space in which data is stored for use by all the threads. In this regard, the operation of the system 100 is well known.

According to an embodiment, a thread may have access to a private memory space. The private memory space may be provided in the thread's internal cache hierarchy (not shown in FIG. 1). Alternatively, it may be provided by a portion of the universal memory space 150, 250 that is not used by the other threads. Such segregation of the universal memory space may be established as a conventional software-controllable parameter of system operation.

Figure 2:
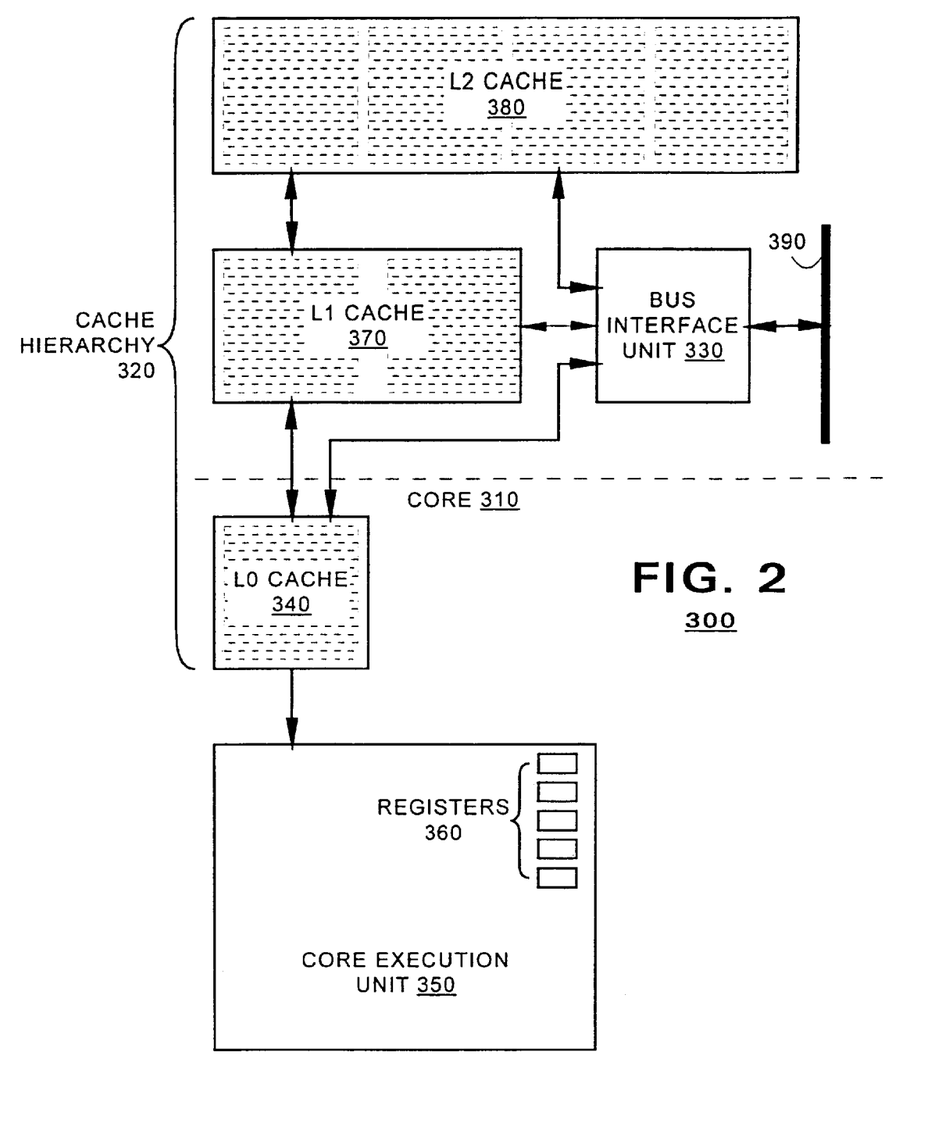
FIG. 2 is a simplified block diagram of a processor suitable for use with the present invention.

FIG. 2 is a simplified block diagram of functional units within an agent 300 suitable for use with the embodiments described herein. The agent 300 may include a processor core 310, a cache hierarchy 320 and a bus interface unit 330. These entities may overlap to a degree; in the example shown in FIG. 2, an L0 cache 390 is shown as a member both of the core 310 and the cache hierarchy 320. The core 310 may include the L0 cache 340 and a core execution unit 350. One or more registers 360 may be provided within the core execution unit 350. These registers may have a predetermined width W, for example, 16, 32 or 64 bits.

The cache hierarchy 320 may include one or more layers of cache. In the example shown in FIG. 2, three layers of cache are shown, the L0 cache 340, an L1 cache 370 and an L2 cache 380. Typically, lower level caches such as the L0 cache are smaller and faster than the caches at the higher levels, such as the L2 cache. In the higher level caches, such as the L2, cache lines may have a width L that relates to the largest increment of data that may be transferred pursuant to a single transaction on the external bus. For example, cache lines in the Pentium Pro® processor are 64 bytes while the register widths are 32 bits. The middle level and lower level caches (L0 and L1) may but need not be organized into cache line sized entries.

The bus interface unit 340 interfaces the other functional units with the external bus 390. In this regard, the structure and operation of an agent is well known.

Figures 3, 4:
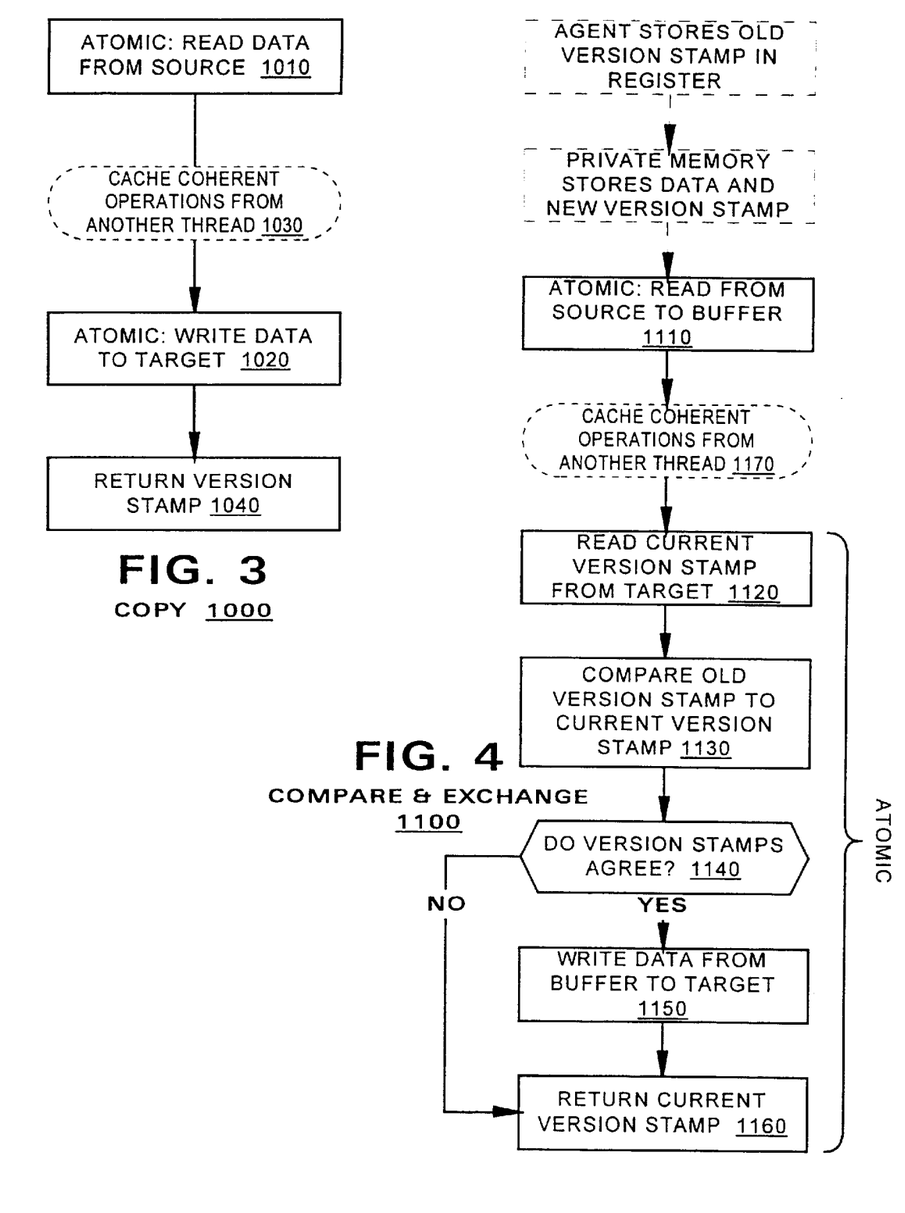
FIG. 3 illustrates a method of operation for a memory-to-memory copy instruction according to an embodiment of the present invention.
FIG. 4 illustrates a method of operation for a memory-to-memory compare and exchange instruction according to an embodiment of the present invention.

FIG. 3 illustrates a method of operation 1000 for a memory-to-memory copy instruction according to an embodiment of the present invention, to copy a value from a source address in the shared memory to a target address in the shared memory. The method may begin by atomically reading data from the source address to a non-snooped buffer of the thread (box 1010). It concludes by atomically writing the data from the non-snooped buffer to the target address (box 1020). The read and write operations are both atomic individually, Indeed, between the atomic read and atomic write operations, automatically need not be maintained throughout the entirety of the method 1000. Other threads may perform cache coherent operations to data either at the source address or at the target address (represented by box 1030). Optionally, at the conclusion of the atomic write 1020, the thread may return a version stamp of the source data to the software level (box 1040).

The method of FIG. 3 is useful because it avoids certain deadlock events that can occur in multiprocessor systems if the memory-to-memory COPY operation were to require ownership of both the source and the target cache lines. One such deadlock event can occur when a first thread attempts to perform an operation COPY [B]=[A] while a second thread attempts to perform a COPY [A]=[B] and both instructions are atomic. In this situation, a first thread reads the source address B and acquires its ownership. The second thread acquires ownership of the source address A before the first thread can access it. Having read the source addresses, the two threads attempt to gain exclusive ownership of their respective target addresses (to write to the target addresses). However, because each thread locked the other thread's target and because each thread's instructions are atomic, neither thread can complete its operation. They deadlock.

If the same event were to occur in a system operating in accordance with the present embodiments, no such deadlock would occur. For the COPY [B]=[A] instruction, the first thread (say, 110) would read the data atomically from address A in the shared memory to a non-snooped buffer. The read portion of the COPY operation is atomic; ownership of address A cannot be released until the read completes. Once the atomic read portion of the COPY operation completes, however, the ownership of address A is released. At the same time, the second thread (say, 120) may read the data from address B in the shared memory to its own non-snooped buffer. Again, the operation is atomic; until the second thread completes the read of address B, no other thread can acquire ownership of address B. When each thread attempts to write to the target addresses, the target addresses are only owned exclusively for the duration of the write portion of the COPY operation (that stores data from the non-snooped buffer to the target address). The threads can complete their write operations. No deadlock occurs.

FIG. 4 illustrates a method of operation 1100 for a memory-to-memory compare-and-exchange instruction according to an embodiment of the present invention. Before the operation begins, an "old" version stamp may be stored internally within a register of a thread. The version stamp may have been obtained by the thread during operation of prior instructions; it is an "old version stamp." Also, prior to operation of the instruction a private source address stores data to be written to the target address. The source address also stores a new version stamp to be written to the target address.

Operation for the compare-and-exchange instruction may begin with an atomic read of data from the source address to a non-snooped buffer of the thread (box 1110). Thereafter, the thread may read a copy of the version stamp currently stored at the target address (the "current version stamp") (box 1120). The thread may compare the old version and determine whether they agree (boxes 1130–1140). If so, the thread may write the non-snooped buffer (which holds the source data) to the target address (box 1150). Both the data and the new version stamp may be stored at the target address. Thereafter, or if the version stamps do not agree, the thread may return the current version stamp to the software level (box 1160).

In an embodiment, the sequence of operations represented by boxes 1120–1160 may be atomic. They cannot be interrupted by other cache coherent operations to the target address performed by another thread. Of course, cache coherent operations from other threads (represented by box 1170) are permissible between the atomic read of the source data, box 1110, and the atomic sequence of boxes 1120–1160. Thus, exclusive ownership of the target address is ensured. No other thread may gain access to the target address until the conditional update portion of the memory-to-memory compare-and-exchange instruction is completed (or aborted if the version numbers mismatch).

Because the compare and exchange operation 1100 may be performed as a pair of discrete atomic operations rather a single atomic sequence of operations, the operation 1000 avoids the deadlock events that plague other schemes. While the read of data (box 1110) may cause the source address to be owned by a single thread, the thread's ownership may be released once the read completes. Similarly, the operations of boxes 1120–1160 may cause a target address to be exclusively owned by a single thread but only until the write, if one occurs, is completed. The method of FIG. 4 prevents deadlock from occurring because the source address and target address are not required to be owned concurrently by the thread executing the instruction. This significantly simplifies use, silicon design and validation of these operations.

According to an embodiment, rather than passing the current version stamp back to the software at box 1160, the thread simply may generate a flag indicating whether the version stamps agreed at box 1140 or not.

Because the foregoing embodiments are memory-to-memory operations, the data transfers caused by the copy and the compare-and-exchange operations may exceed size restrictions that otherwise would exist if the instructions were register-to-memory operations. Accordingly, the instructions may cause a much larger data transfer to atomically occur in single instruction. In an embodiment, the instructions may operate on any element of data up to the size of a cache line. Cache lines in the Pentium Pro® processor are 64 bytes. Thus, the foregoing embodiments, if applied to the Pentium Pro® processor, could yield an eight-fold increase over instructions presently used. Of course, the principles of the foregoing embodiments may be applied to other processors having larger cache line sizes (e.g., 128, 256 or more bytes). According to an embodiment, the version stamp may be provided in an arbitrary location within each cache line. The location of the version stamps within a cache line may be determined by software developers (those who use the instructions), and identified as a software controllable parameter to the instruction itself. As is known, system memories 150, 250 may be organized as a regular array of cache lines of data. However, memory addresses typically identify data locations at granularities smaller than a cache line. Thus a memory address may be considered to include two fields: a cache-line address, typically represented by the most significant bits of the address, and an offset into the cache line, represented by lesser significant bits of the address. Although embodiments of the memory-to-memory copy and the memory-to-memory compare-and-exchange instructions may deal in cache-line sized reads or writes of data, the offset field may be used advantageously to identify a location of the version stamp within the cache line. The thread may interpret the offset field to identify a location of data to use as the version stamp.

According to an embodiment, addressing may be applied to a system having any predetermined cache line length. As described above, the Pentium Pro® processor operates using a cache line length of 64 bytes; other systems may operate on cache lines of a different length. Typically, addresses used for shared memory transactions are aligned to the cache line lengths (to avoid false sharing). In a system having a cache line length of L bytes, then the lower $\log_2(L)$ bits of an address have no bearing on which cache line is addressed. These lower $\log_2(L)$ may be used as the offset field to determine the location of the version stamp within the addressed cache line. According to an embodiment, a version stamp may be sized to be a one, two, four or eight bytes, or any size up to the size W of the thread's internal registers.

According to an embodiment, a version stamp may have a predetermined length (in bytes). Alternatively, the length of a version stamp may vary as a software controllable parameter. Syntax may be provided for the copy and compare-and-exchange instructions to define a length of the version stamp. In such an embodiment, data manipulations (transfers, comparisons) directed to a version stamp may be made in data sizes defined by the version stamp length parameter of the instruction.

Figure 5:
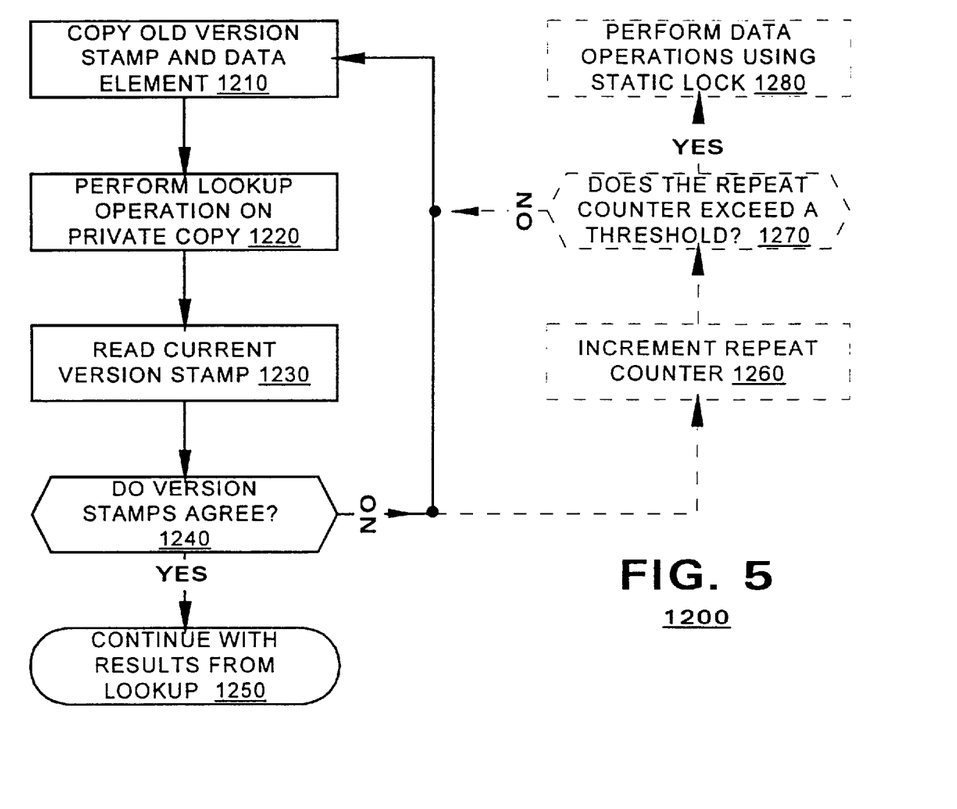
FIG. 5 illustrates a usage model for the memory-to-memory copy instruction of FIG. 3 according to an embodiment of the present invention.

The instructions presented in the foregoing embodiments may find application for data sizes on the order of a system's cache line. They, however, may contribute to data management operations for data structures of larger sizes. FIG. 5 illustrates a usage model 1200 for an atomic lookup operation for a data structure according to an embodiment of the present invention. The usage model shown in FIG. 5 may operate at a software level whereas the copy instruction on which it is based may operate at the hardware level of the thread.

According to the embodiment, a thread may atomically copy a version stamp and a data element of the data structure (box 1210); this first copy of the version stamp is the "old" version. The element may be copied in conjunction with the version stamp. The thread may perform any operations as dictated by software that may be required by the lookup operation (box 1220). When the lookup data operations are complete, the thread may atomically read another copy of version stamp, called the "current version stamp" (box 1230). The thread may compare the old and current version stamps to determine whether they agree (box 1240). If they agree, then the results of the data operations are valid (box 1250); the software may propagate the results computed by box 1230 to other stages.

If the version stamps do not agree, it could indicate that the data structure was altered by another thread while the first thread performed the data operations in box 1220. The results obtained from those data operations could be invalid. Accordingly, if the version stamps do not agree, the thread may retry the method 1200 by returning to box 1210.

In an alternate embodiment, shown in FIG. 5 in phantom, the thread may maintain a counter of the number of unsuccessful retry attempts. If the old and current version stamps repeatedly do not agree at box 1250, the thread may increment a counter and determine whether the counter exceeds a predetermined threshold (boxes 1260–1270). If the threshold is exceeded, the thread may retry the data operations using a traditional lock variable (semaphore) that remains asserted throughout the data operations' duration (box 1280). Otherwise, if the threshold is not exceeded, the thread may reiterate the operations of boxes 1210–1240.

In another embodiment, rather than advance to static lock at box 1290, the software may impose a random or exponentially increasing back-off delay before re-attempting the procedure starting at box 1210. Thus, if two threads repeatedly engage in competition to a shared resource, the random or exponentially increasing back-off delay can prevent repeated races between them.

The usage model described in FIG. 5 finds application with data structures of all sizes. At one extreme, a single version stamp may be provided for the entire data structure. Data structures conventionally may be quite large relative to cache line sizes. For example, they may be large (e.g. hundreds of kilobytes), dynamically-allocated data structures that are distributed across multiple virtual memory locations. In this embodiment, a modification to any part of the data structure by one thread may cause the version stamp to be updated and may cause another thread operating pursuant to FIG. 5 to reiterate the operation several times over.

Another extreme may be presented when a version stamp is provided at each cache line in the data structure. In this case, one thread's modification of a cache line of the data structure may cause reiteration of another thread's operation of FIG. 5 only if the other thread is operating upon the same cache line. In this embodiment, the likelihood of reiteration may be substantially reduced when compared to the foregoing embodiment. This second embodiment, of course, expands the memory consumed by the data structure; not only must the substantive data of the structure be stored in memory but version stamps must be stored at addresses as well. In implementation, it is expected that software designers will determine how to construct their data structures and how to distribute version stamps throughout it. For the purposes of this discussion, it is sufficient to note that the operation of FIG. 5 finds application with implementations at either extreme or anywhere in between.

Figure 6:
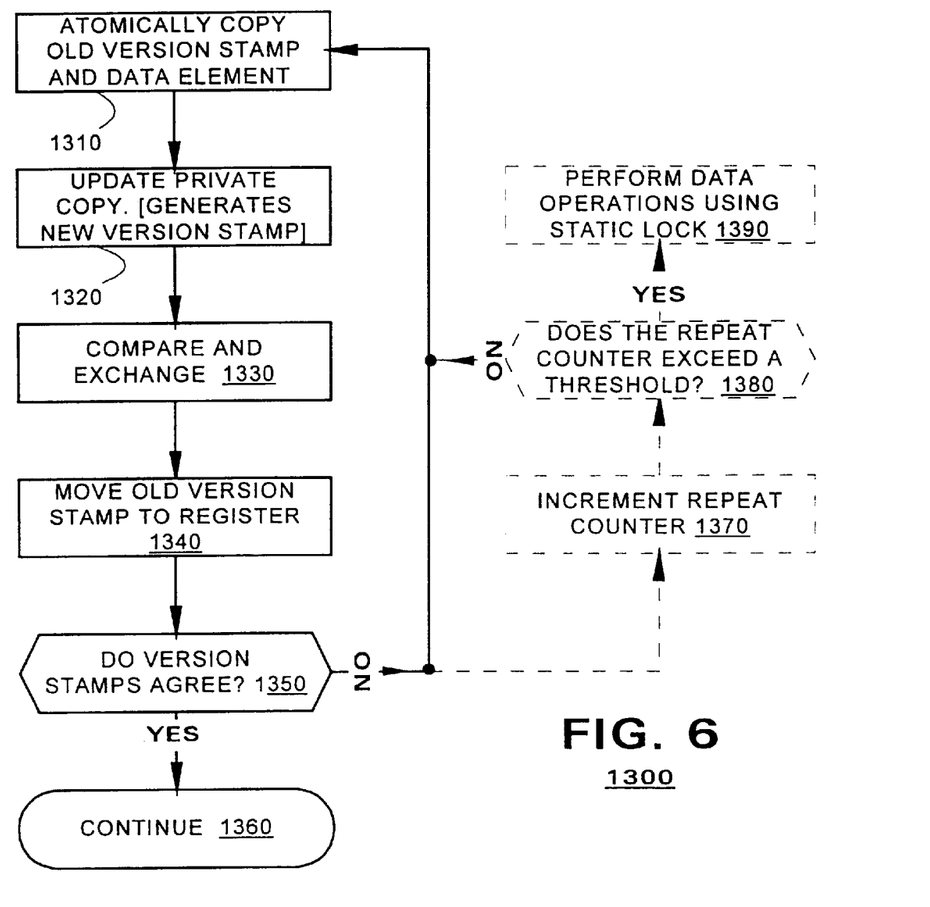
FIG. 6 illustrates a usage model for the memory-to-memory compare and exchange instruction of FIG. 4 according to an embodiment of the present invention.

FIG. 6 illustrates a usage model data update method 1300 according to an embodiment that may employ the compare and exchange operation of FIG. 4. This usage model may be executed by the thread at the software level. The method 1300 may find application with data structures having only a single version number for the entire structure, data structures having version numbers for each cache line in the structure or embodiments in between these two extremes.

The method 1300 may begin when the thread atomically copies an "old" version stamp and data element from the data structure (box 1310). Thereafter, the thread may operate on its private copy of the data element as may be dictated by software (box 1320). To distinguish the updated data element from prior versions of the same element, the updating thread may create a "new" version number within the private copy of the data element. When the data update operations are complete, the thread may load the "old" version number into a predetermined register for access by the compare-and-exchange instruction (box 1330). The thread then executes the compare-and-exchange instruction (box 1340). As described in FIG. 3, the compare and exchange instruction may compare old and current version numbers at the hardware level and, if they agree, write data from a source location to a target location.

After the compare-and-exchange operation completes, the thread may compare the old and current versions stamps at the software level (box 1350). If so, then the update was successful and the software may advance to other stages of processing (box 1360).

If the compare and exchange was not successful, the method 1300 may be retried. As with the operation of FIG. 5, several embodiments are available. In a first embodiment, the thread may return to box 1310 and retry the entire method 1300. Alternatively, the software may maintain a counter of unsuccessful iterations and, if the counter exceeds a predetermined threshold, the software may attempt to accomplish the data operations using a permanent lock (boxes 1370–1390). And, as with the other embodiment, random delays or exponentially increasing delays may be introduced before retries to avoid race conditions.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of implementing an atomic memory-to-memory copy of data, comprising:

atomically reading data to a thread from a source location, and atomically writing the data from a thread to a target location, wherein cache coherent operations may occur between the reading and the writing.

2. The method of claim 1, wherein the reading and writing respectively transfer a quantity of data larger than an internal register of the thread.

3. The method of claim 1, wherein the reading and writing respectively transfer a quantity of data up to a cache line of a computer system in which the thread is located.

4. The method of claim 1, wherein the reading is directed to a predetermined address in a system memory, a first portion of the address representing a cache line from which the data is to be read and a second portion of the address representing a location within the cache line where a version stamp is located.

5. The method of claim 4, wherein, in a system having aligned cache lines of L bytes in length, the second address portion is $\log_2(L)$ in length.

6. The method of claim 4, wherein a length of the version stamp is defined by an instruction used by software to invoke the method.

7. The method of claim 1, wherein the atomic reading operation and the atomic writing operation are performed pursuant to execution of a single memory-to-memory copy instruction.

8. The method of claim 1, further comprising:
prior to the reading, storing a first version stamp associated with the data,
subsequent to the reading, determining a second version stamp associated with the data, and
comparing the first and second version stamps, and
if the version stamps do not match, repeating the method.

9. A method of implementing an atomic memory-to-memory copy of data, comprising:
atomically reading data from a source location to a thread, and
atomically:
acquiring exclusive ownership of a target location, and writing the data to the target location,
wherein the atomic reading operation and the atomic acquisition-and-writing operation may be interrupted by cache coherent operations.

10. The method of claim 9, wherein the reading and writing respectively transfer a quantity of data larger than an internal register of the thread.

11. The method of claim 9, wherein the reading and writing respectively transfer a quantity of data up to a cache line of a computer system in which the thread is located.

12. The method of claim 9, wherein the reading is directed to a predetermined address in a system memory, a first portion of the address representing a cache line from which the data is to be read and a second portion of the address representing a location within the cache line where a version stamp is located.

13. The method of claim 12, wherein a length of the version stamp is defined by an instruction used by software to invoke the method.

14. The method of claim 12, wherein, in a system having aligned cache lines of L bytes in length, the second portion is $\log_2(L)$ in length.

15. The method of claim 9, wherein the atomic reading operation and the atomic acquisition-and-writing operation are performed pursuant to execution of a single memory-to-memory copy instruction.

16. The method of claim 15, further comprising, upon conclusion of the instruction, determining a version number of the data.

17. The method of claim 9, wherein the atomic reading operation and the atomic acquisition-and-writing operation respectively read the data to and write the data from a processor.

18. The method of claim 9, further comprising:
prior to the reading, storing a first version stamp associated with the data,
subsequent to the reading, determining a second version stamp associated with the data, and
comparing the first and second version stamps, and
if the version stamps do not match, repeating the method.

19. The method of claim 9, further comprising:
prior to the reading, storing a first version stamp associated with the data,
subsequent to the reading, determining a second version stamp associated with the data, and
comparing the first and second version stamps, and
if the version stamps do not match, incrementing a counter, and
if the counter exceeds a predetermined value, locking the source location and copying the data from the source location to the target location while the source location is continuously locked.

20. A data transfer method, comprising:
copying an array of data from a first space in a memory to a second space in a memory, the copying comprising, for each location in the first space:
locking the location in the first space,
reading a data unit from the location in the first space to a thread,
releasing the lock when the reading concludes, and
writing the data unit to a location in the second space;
wherein, for each location in the first space, other threads are permitted access to the location between the respective reading and writing operations performed on the data unit associated therewith.

21. The data transfer method of claim 20, further comprising:
prior to each reading, storing a first version stamp associated with the data unit corresponding thereto,
subsequent to the reading, determining a second version stamp associated with the corresponding data unit, and
comparing the first and second version stamps, and
if the version stamps do not match, repeating the copying with respect to the corresponding data unit.

22. The data transfer method of claim 21, wherein the array includes a single version stamp.

23. The data transfer method of claim 21, wherein each data unit includes a version stamp.

* * * * *